(12) United States Patent
Wasserscheid et al.

(10) Patent No.: US 11,459,233 B2
(45) Date of Patent: Oct. 4, 2022

(54) PROCESS AND PLANT FOR PRODUCING AND STORING HYDROGEN

(71) Applicant: HYDROGENIOUS TECHNOLOGIES GmbH, Erlangen (DE)

(72) Inventors: Peter Wasserscheid, Erlangen (DE); Wolfgang Arlt, Nuremberg (DE); Daniel Teichmann, Munich (DE)

(73) Assignee: HYDROGENIOUS LOHC TECHNOLOGIES GMBH, Erlangen (DE)

( * ) Notice: Subject to any disclaimer, the term of this patent is extended or adjusted under 35 U.S.C. 154(b) by 132 days.

(21) Appl. No.: 15/527,142

(22) PCT Filed: Nov. 9, 2015

(86) PCT No.: PCT/EP2015/076030
§ 371 (c)(1),
(2) Date: May 16, 2017

(87) PCT Pub. No.: WO2016/078948
PCT Pub. Date: Mar. 26, 2016

(65) Prior Publication Data
US 2017/0341936 A1    Nov. 30, 2017

(30) Foreign Application Priority Data

Nov. 17, 2014   (DE) ..................... 10 2014 223 427.1

(51) Int. Cl.
*C01B 3/00*    (2006.01)
*C01B 3/38*    (2006.01)
(Continued)

(52) U.S. Cl.
CPC ............... *C01B 3/0015* (2013.01); *B01J 7/00* (2013.01); *B01J 19/245* (2013.01); *C01B 3/26* (2013.01);
(Continued)

(58) Field of Classification Search
CPC ... B01J 19/245; B01J 7/00; B01J 8/067; B01J 2208/00221; C01B 2203/0233;
(Continued)

(56) References Cited

U.S. PATENT DOCUMENTS 2,642,381 A * 6/1953 Dickinson .............. C10G 11/10
                                                              208/57
5,093,535 A    3/1992 Harrison et al.
(Continued)

FOREIGN PATENT DOCUMENTS

EP         1 475 349 A2    11/2004

OTHER PUBLICATIONS

Taube et al. "A System of hydrogen-powered vehicles with liquid organic hydrides", Int. J. Hydrogen Energy, vol. 8, No. 3, pp. 213-225 (Year: 1983).*
(Continued)

*Primary Examiner* — Steven J Bos
*Assistant Examiner* — Syed T Iqbal
(74) *Attorney, Agent, or Firm* — McGlew and Tuttle, P.C.

(57) ABSTRACT

A process for producing and storing hydrogen includes providing an intermediate gas mixture having an increased proportion of hydrogen and contacting of the intermediate gas mixture with a hydrogen carrier medium in order to hydrogenate the hydrogen carrier medium.

4 Claims, 1 Drawing Sheet

(51) Int. Cl.
*C01B 3/48* (2006.01)
*C01B 3/26* (2006.01)
*C01B 32/50* (2017.01)
*B01J 7/00* (2006.01)
*B01J 19/24* (2006.01)
*F17C 11/00* (2006.01)

(52) U.S. Cl.
CPC .............. *C01B 3/38* (2013.01); *C01B 3/48* (2013.01); *C01B 32/50* (2017.08); *F17C 11/005* (2013.01); *C01B 2203/0233* (2013.01); *C01B 2203/0288* (2013.01); *C01B 2203/044* (2013.01); *C01B 2203/047* (2013.01); *C01B 2203/0495* (2013.01); *C01B 2203/127* (2013.01); *C01B 2203/142* (2013.01); *F17C 2221/012* (2013.01); *F17C 2265/015* (2013.01); *Y02E 60/32* (2013.01)

(58) Field of Classification Search
CPC ...... C01B 2203/0288; C01B 2203/044; C01B 2203/047; C01B 2203/0495; C01B 2203/127; C01B 2203/142; C01B 32/50; C01B 3/0015; C01B 3/26; C01B 3/38; C01B 3/48; C01B 3/384; C01B 3/386; C01B 3/382; C01B 2203/0805; C01B 2203/0822; C01B 2203/043; C01B 2203/1241; C01B 2203/0255; C01B 2203/0283; C01B 2203/0415; C01B 2203/143; C01B 2203/0811; C01B 2203/0261; C01B 2203/0844; C01B 2203/141; C01B 2203/1294; F17C 11/005; F17C 2221/012; F17C 2265/015; Y02E 60/321; Y02E 60/328; Y02E 60/324; Y02P 20/128
See application file for complete search history.

(56) References Cited

U.S. PATENT DOCUMENTS

| | | |
|---|---|---|
| 7,850,944 B2 | 12/2010 | Genkin et al. |
| 2001/0055559 A1* | 12/2001 | Sanfilippo ............... C01B 3/063 423/648.1 |
| 2006/0177372 A1 | 8/2006 | Doshi |
| 2010/0058771 A1* | 3/2010 | Gil ............................ C01B 3/38 60/780 |
| 2010/0068571 A1 | 3/2010 | Collings et al. |
| 2010/0254893 A1* | 10/2010 | Kim ....................... C01B 3/384 423/655 |
| 2012/0040256 A1* | 2/2012 | Kani .................. H01M 8/0618 429/410 |
| 2012/0058921 A1* | 3/2012 | Van Den Berg ....... B01D 53/75 252/373 |
| 2012/0321549 A1* | 12/2012 | Okada ................. H01M 8/0618 423/651 |

OTHER PUBLICATIONS

Taube M. et al., A system of hydrogen-powered vehicles with liquid organic hydrides, International Journal of Hydrogen Energy, Elsevier Science Publishers B. V., Barking, GB, Bd. 8, Nr. 3, Jan. 1, 1983, pp. 213-225.

Daniel Teichmann et al., A future energy supply based on Liquid Organic Hydrogen Carriers (LOHC), Energy & Environmental Science, Bd. 4, Nr. 8, Jan. 1, 2011, p. 2767.

Haeussinger P et al., Hydrogen, Jan. 1, 1989, Ullmann's Encyclopedia of Industrial Chemistry. High Performance Fibers To Imidazole and Derivatives; [Ullmann's Encyclopedia of Industrial Chemistry], Weinheim, VCH Verlag, DE, pp. 297-441.

* cited by examiner

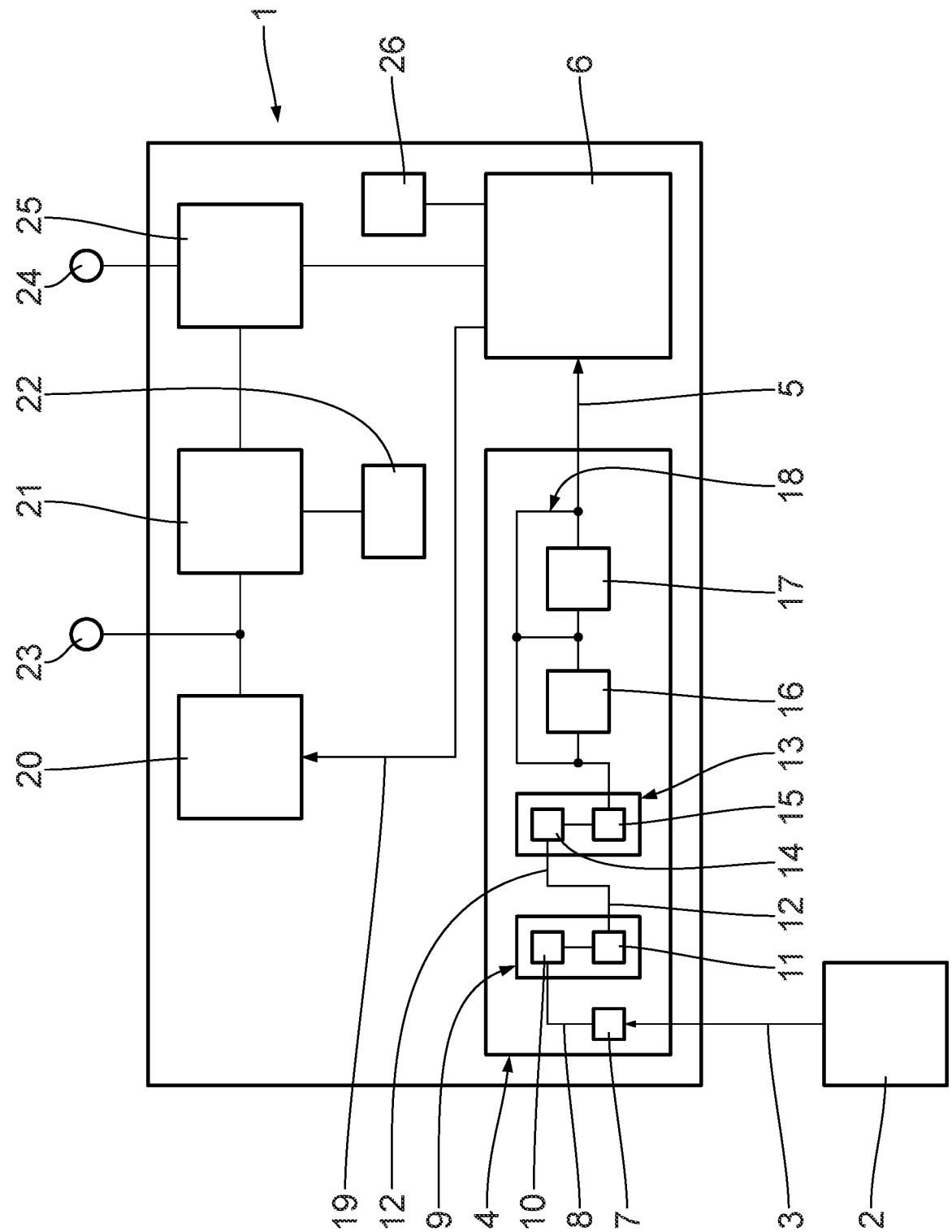

PROCESS AND PLANT FOR PRODUCING AND STORING HYDROGEN

CROSS REFERENCE TO RELATED APPLICATIONS

This application is a United States National Phase Application of International Application PCT/EP2015/076030 filed Nov. 9, 2015 and claims the benefit of priority under 35 U.S.C. § 119 of German Application 10 2014 223 427.1 filed Nov. 17, 2014, the entire contents of which are incorporated herein by reference.

FIELD OF THE INVENTION

The present invention relates to a process and a plant for producing and storing hydrogen.

BACKGROUND OF THE INVENTION

Various processes for the industrial production of hydrogen are known from the prior art. The production of hydrogen from methane mixtures and hydrocarbon mixtures, as occur, for example, in natural gas, is of particular economic importance. The methods available at the present time for obtaining hydrogen from natural gas are complicated and, in particular, only economically viable at large plant sizes.

SUMMARY OF THE INVENTION

It is an object of the present invention to provide a process and a plant for producing and storing hydrogen, which make the production of hydrogen from a raw material gas mixture economically viable, in particular independently of the amount of raw material gas fed in.

The object is achieved by a process for producing and storing hydrogen, which comprises the process steps a. provision of an intermediate gas mixture having an increased proportion of hydrogen, b. contacting of the intermediate gas mixture with a hydrogen carrier medium in order to hydrogenate the hydrogen carrier medium.

The object is further achieved by a plant for producing and storing hydrogen, which comprises a reaction apparatus for contacting an intermediate gas mixture having an increased proportion of hydrogen and/or a reduced proportion of carbon monoxide with a hydrogen carrier medium in order to hydrogenate the hydrogen carrier medium.

The key aspect of the invention is that an intermediate gas mixture is contacted with a hydrogen carrier medium in order to hydrogenate the hydrogen carrier medium. Hydrogen present in the intermediate gas mixture is bound directly to the carrier medium. Other components of the intermediate gas mixture, on the other hand, do not react with the carrier medium and are not bound to this. Compared to a raw material gas mixture, the intermediate gas mixture has an increased proportion of hydrogen. The proportion of carbon monoxide in the intermediate gas mixture has been comparatively reduced. It was surprisingly found that the intermediate gas mixture is present at a pressure and a temperature which are suitable for carrying out the hydrogenation of the hydrogen carrier medium directly. As a result of the hydrogenation of the hydrogen carrier medium, the hydrogen component of the intermediate gas mixture is separated off from carbon dioxide and methane, since neither carbon dioxide nor methane react with the carrier medium. On the other hand, hydrogen forms chemical bonds with the carrier medium. In particular, the hydrogen carrier medium is a liquid organic hydrogen carrier (LOHC) which is known, for example, from EP 1 475 349 A2. In particular, the intermediate gas mixture after the pretreatment is in a pressure range from 5 bar to 50 bar, in particular in a pressure range from 10 bar to 40 bar and in particular in a pressure range from 25 bar to 35 bar. In particular, the intermediate gas mixture is in a temperature range from 100° C. to 400° C., in particular from 120° C. to 300° C. and in particular from 150° C. to 280° C. The intermediate gas mixture can be used directly in this form and under these conditions for the hydrogenation of the LOHC, in particular using a catalyst. In particular, a solid catalyst which can be present as powder, as shaped body or as structured component is used. The catalyst contains at least one transition metal, in particular nickel, ruthenium, rhodium, palladium, platinum, cobalt or copper, as active component. The active component of the catalyst is, in particular, anchored on an inorganic or organic, porous support material and is used in this supported form in the hydrogenation. The hydrogenation of the LOHC is carried out, in particular, at process temperatures in the range from 150° C. to 280° C. and at a process pressure in the range from 10 bar to 100 bar. The process of the invention makes the hydrogen purification necessary in processes according to the prior art, in particular a removal of carbon dioxide, in particular for the intermediate gas mixture, dispensable. In particular, it is not necessary firstly to produce hydrogen in isolated form and subsequently store this hydrogen. The hydrogen is chemically bound directly from the intermediate gas mixture to the hydrogen carrier medium. Hydrogen of the intermediate gas mixture is chemically bound at least in part and in particular completely to the hydrogen carrier medium. Contacting of the intermediate gas mixture with the hydrogen carrier medium brings about a depletion, in particular a selective depletion, of the hydrogen in the intermediate gas mixture. Removal of other gas constituents from the intermediate gas mixture, in particular nitrogen and/or methane, is not necessary. It has been found according to the invention that the separation of particular gas components from the intermediate gas mixture is dispensable since these gas constituents do not react with the hydrogen carrier medium. These constituents are not relevant to the hydrogenation of the hydrogen carrier medium and in particular do not interfere. The process is uncomplicated. Capital costs and operating costs are reduced. In particular, a prepurification, i.e. a pretreatment of the raw material gas mixture, can be utilized for at least partly removing impurities, in particular catalyst poisons such as carbon monoxide or oxygen. The process of the invention makes it possible, in particular, to produce and store hydrogen from natural gas as raw material gas mixture in relatively small and decentralized plants under economically viable conditions. As a result, it is possible to utilize small-volume natural gas sources, known as stranded gas sources, for the production, storage and transport of hydrogen. The process of the invention thus opens up natural gas sources in which natural gas occurs, for example, as accompanying gas in petroleum recovery and which have hitherto not been economically usable and have therefore not been utilized. Further hitherto unutilized natural gas sources are possible in natural gas exploration and in hydraulic fracturing, known as fracking. In particular, it is not necessary to inject accompanying gas back into the ground and thus leave it unutilized. The process of the invention is particularly industrially relevant for converting accompanying gas from petroleum recovery, in particular on a drilling platform or at a drilling station in remote regions, into a transportable and storable form of hydrogen. The process of the invention thus opens up small and remote natural gas recovery sites for the economical production of hydrogen. Utilization of additional natural gas sources for hydrogen production in the process of the invention enables the transport routes from the natural gas source to the hydrogen user to be shortened. A further significant advantage of the process is that the intermediate gas mixture, which comprises both hydrogen and other gas constituents, is converted directly into a storable and transportable form from which hydrogen can be liberated directly in a very high purity of greater than 99%. Complicated and expensive process steps for separating off carbon dioxide, hydrocarbon residues and possibly for separating off nitrogen and trace gases are dispensable. The hydrogenated LOHC is liquid and can be transported in pipelines, ships or tankers of all types to a place where hydrogen/energy is required. This site can be physically removed from the site of natural gas recovery. The LOHC loaded with hydrogen can be converted at any low-energy point in time, i.e. when there is a demand for hydrogen or a demand for energy, into the dehydrogenated form of the LOHC in a dehydrogenation unit with introduction of heat and in particular in the presence of a suitable catalyst with liberation of molecular hydrogen. Hydrogen is made available in very high purity. The hydrogen obtained in this way can, in particular after compression, be utilized as material, for hydrogenation of a chemical compound or for fueling a hydrogen vehicle, but also for conversion into electricity in a fuel cell or a combustion chamber.

The process of the invention can also be utilized for contacting an intermediate gas mixture from chloralkali electrolysis. In chloralkali electrolysis, a salt, in particular sodium chloride, which is present in aqueous solution is decomposed by means of an electric potential. The reaction products are separated by means of a selective membrane which is permeable to sodium ions and impermeable to chlorine ions. Chloralkali electrolysis is employed mainly for producing chlorine and sodium hydroxide. Hydrogen gas is obtained as by-product. According to the invention, it has been found that the hydrogen which is not economically usable because of its low density and/or poor transportability can be chemically bound directly to the hydrogen carrier medium by contacting of the intermediate gas mixture in the presence of a catalyst. Separate isolation of the hydrogen is dispensable. The intermediate gas mixture in chloralkali electrolysis is, for example, a hydrogen/nitrogen mixture or a hydrogen/argon mixture in which traces of hydrocarbons or oxygen can additionally be present. Pretreatment of the intermediate gas mixture could, for example, be carried out by removing at least part of the oxygen.

The process of the invention can also be utilized for contacting an intermediate gas mixture from biomass gasification. In biomass gasification, biomass is reacted with air, steam, carbon dioxide, supercritical water or oxygen at temperatures of more than 400° C. to give a hydrogen-containing intermediate gas mixture. The hydrogen gas is not directly industrially usable in the intermediate gas mixture using processes known from the prior art. According to the invention, it has now been found that the hydrogen from the intermediate gas mixture formed in biomass gasification can be chemically bound directly to the hydrogen carrier medium by contacting in the presence of a catalyst. Separate isolation of the hydrogen is dispensable. The intermediate gas mixture from biomass gasification is, for example, a hydrogen/carbon dioxide mixture or a hydrogen/methane mixture in which traces of water vapor, organic substances or oxygen can additionally be present. Pretreatment of the intermediate gas mixture could, for example, be carried out by at least partly removing sulfur components or nitrogen components.

A process in which a raw material gas mixture comprising at least one hydrocarbon compound is provided and pretreated so as to result in an intermediate gas mixture having an increased proportion of hydrogen allows advantageous utilization of raw material gas mixtures which contain at least one hydrocarbon compound. The intermediate gas mixture is produced from a raw material gas mixture comprising at least one hydrocarbon compound, in particular methane, by pretreatment. The intermediate gas mixture produced by pretreatment has a proportion of hydrogen which is present in a mixture with carbon dioxide and methane.

A process in which the pretreatment comprises desulfurization for defeating the raw material gas mixture of sulfur compounds makes a suitable preparation of the raw material gas mixture possible. The raw material gas mixture is sulfur-free.

In a process in which the pretreatment comprises steam reforming, in particular in the presence of a catalyst, in particular a nickel-containing catalyst, the hydrogen-containing intermediate gas is produced from methane or hydrocarbon mixtures. Steam reforming is carried out in a temperature range from 300° C. to 1300° C., in particular in a temperature range from 400° C. to 1100° C. and in particular in a temperature range from 600° C. to 1000° C. In particular, steam reforming is carried out at a pressure of from 3 bar to 80 bar, in particular from 10 bar to 50 bar and in particular from 15 bar to 35 bar. This makes later compression of the hydrogen formed dispensable. The process is additionally simplified thereby.

A process in which steam reforming is carried out in a plurality of stages, in particular in two stages, makes it easier to attain a temperature required for steam reforming in order to be able to convert the raw material gas mixture largely completely. In a first reforming stage, a first temperature which is, in particular, not sufficient to convert the raw material gas mixture completely is attained. In a secondary reforming stage, the temperature required for steam reforming is attained in a second reformer by addition of air and partial combustion of an intermediate formed in the first reforming stage, in particular by partial combustion of the hydrogen formed in the first reforming stage. The second temperature of the second reforming stage is greater than the first temperature of the first reforming stage.

In a process in which the pretreatment comprises a water gas shift reaction, in particular in the presence of a catalyst, the proportion of hydrogen can be increased compared to the raw material gas mixture. In addition, the proportion of carbon monoxide in the intermediate gas mixture can be reduced. The water gas shift reaction comprises a reaction of carbon monoxide with water to form carbon dioxide and hydrogen. The water gas shift reaction occurs in a temperature range from 100° C. to 500° C., in particular in the range from 150° C. to 450° C. and in particular in the range from 180° C. to 400° C. During the water gas shift reaction, a process pressure in the range from 3 bar to 80 bar, in particular from 10 bar to 50 bar and in particular from 20 bar to 40 bar, prevails.

In a process in which the water gas shift reaction is carried out in a plurality of stages, in particular two stages, the reduction of the proportion of carbon monoxide and/or the increase in the proportion of hydrogen in the intermediate gas mixture is improved. In a first water gas shift reaction stage, the process temperature is in the range from 300° C.

to 500° C. In the first water gas shift reaction stage, use is made, in particular, of a solid iron/chromium catalyst in order to utilize, in particular, a high reaction rate at high process temperatures. In a second water gas shift reaction, the process temperatures are in the range from 80° C. to 300° C., in particular from 100° C. to 280° C. and in particular from 120° C. to 250° C. In the second water gas shift reaction stage, it is possible to utilize, for example, a copper/zinc oxide catalyst or a supported catalyst based on Ru in order to achieve, in particular, an improved conversion of carbon monoxide, a reduction in the proportion of carbon monoxide in the intermediate gas mixture. In the case of the two-stage water gas shift reaction, the proportion of carbon monoxide in the intermediate gas mixture is typically less than 0.5% by volume, in particular about 0.2% by volume. The proportion of carbon dioxide is in the range from 10% by volume to 15% by volume and in particular from 12.5% by volume to 13% by volume. The proportion of hydrogen after the two-stage water gas shift reaction is at least 40% by volume, in particular at least 42% by volume, in particular at least 44% by volume and in particular not more than 50% by volume. Processes in which the proportion of hydrogen is more than 50% by volume are also conceivable. The volume ratio of carbon dioxide to hydrogen is about 1:3.5.

In a process in which the pretreatment comprises selective removal of carbon monoxide, in particular after a water gas shift reaction, the intermediate gas mixture after the selective removal of carbon monoxide consists essentially of hydrogen, carbon dioxide, water vapor and methane. Selective removal of carbon monoxide means that the maximum proportion of carbon monoxide is not more than 50 ppm and in particular not more than 10 ppm. The selective removal of carbon monoxide is preferably carried out by selective hydrogenation of carbon monoxide to form methane over a hydrogenation catalyst, in particular a nickel-based or cobalt-based catalyst. The process temperatures of the selective hydrogenation are in the range from 50° C. to 600° C., in particular from 100° C. to 500° C. and in particular from 150° C. to 400° C. As an alternative to or in addition to the selective hydrogenation of carbon monoxide, it is possible to employ a selective oxidation of carbon monoxide to carbon dioxide, adsorption of carbon monoxide or a carbon monoxide scrub.

A process in which the pretreatment comprises selective removal of water, in particular after a water gas shift reaction, improves the effectiveness of the process, in particular the concentration of hydrogen in the intermediate gas mixture. The selective removal of the water from the intermediate gas mixture can be partial or complete. The selective removal of the water can, for example, be carried out by precipitation in a partial condenser, by adsorption or by absorption. Such processes are known per se.

A process in which storage of the hydrogenated hydrogen carrier medium occurs allows advantageous and direct handling of hydrogen in chemically bound form. Separate handling of hydrogen gas and all the risks and problems associated therewith are avoided. The hydrogenated hydrogen carrier medium can be handled without complications and has a transport form and storage form which corresponds to that of diesel or other fuels. The physicochemical properties of the hydrogenated LOHC correspond substantially to those of diesel and other fuels.

A process in which dehydrogenation of the hydrogenated hydrogen carrier medium is carried out in order to release hydrogen allows direct utilization of hydrogen. The utilization of hydrogen obtained from natural gas is simplified. In particular, it is conceivable for the dehydrogenation to occur physically removed from the production and storage of the hydrogen and of the hydrogenated hydrogen carrier medium. The hydrogenated hydrogen carrier medium can, for example, be transported in an uncomplicated manner via a pipe network provided for this purpose and/or by means of transport means such as tankers.

A process in which introduction of dehydrogenated hydrogen carrier medium is made possible offers uncomplicated provision of hydrogen carrier medium in order to chemically bind hydrogen. The introduction of the dehydrogenated hydrogen carrier medium occurs, in particular, via a hydrogen carrier medium interface.

A process in which the discharge of hydrogenated hydrogen carrier medium is provided simplifies the opening up and utilization of gas sources which have hitherto been considered to be nonviable, especially from the point of view of economics. A hydrogen carrier medium interface, in particular, a further hydrogen carrier medium interface, can serve for the discharge of the hydrogenated hydrogen carrier medium. The hydrogenated, i.e. loaded, hydrogen carrier medium can be transported away by means of a conduit provided for this purpose and/or by means of tankers.

A process in which carbon dioxide is utilized allows industrial utilization of the carbon dioxide-rich gas obtained in this way. The carbon dioxide-rich gas can, for example, be used as auxiliary for oil recovery, in particular tertiary oil recovery, known as enhanced oil recovery. Utilization of the carbon dioxide as material, in particular in the chemical or petrochemical industry or for producing biomass, for example in an algae farm or a suitable fermentation process, is also possible. In particular, a complicated separation of carbon dioxide from hydrogen is dispensable. The utilization of carbon dioxide occurs, in particular, after hydrogenation of the hydrogen carrier medium. It is a substantial advantage of the process of the invention that carbon dioxide is present in comparatively concentrated form after contacting of the intermediate gas mixture with the hydrogen carrier medium. A typical composition of the residual gas after complete removal of the hydrogen from the intermediate gas mixture by hydrogenation of the hydrogen carrier medium contains more than 20% by volume of carbon dioxide. The remaining gases are water vapor, nitrogen and trace gases. The carbon dioxide content is substantially higher than in air or than in exhaust gases from combustion plants fired using fossil raw materials.

The residual gas can contain certain amounts of hydrogen after the hydrogenation of the hydrogen carrier medium. In this case, the residual gas can advantageously be used for heating purposes. The hydrogen present in the residual gas is utilized thermally. The thermal utilization enables the proportion of hydrogen in the residual gas to be reduced to below 1% by volume. This residual gas having a comparatively high carbon dioxide content can be, as described above, used industrially.

The pretreatment can alternatively also comprise the conversion of the raw material gas mixture into water and coke, in particular at a temperature of above 800° C. This conversion is known as the Kvaerner process. An intermediate gas mixture produced in the Kvaerner process has an increased proportion of hydrogen and/or a reduced proportion of carbon monoxide. This intermediate gas mixture can, according to the invention, be utilized directly for the hydrogenation of the hydrogen carrier medium.

A plant for producing and storing hydrogen serves, in particular, for carrying out a process according to the invention. The plant comprises a pretreatment apparatus for pretreating the raw material gas mixture to give an intermediate gas mixture having a proportion of hydrogen which is increased compared to the raw material gas mixture and/or having a reduced proportion of carbon monoxide. The plant further comprises a reaction apparatus for contacting the intermediate gas mixture with the hydrogen carrier medium in order to hydrogenate the hydrogen carrier medium. The pretreatment apparatus comprises, in particular, a desulfurization unit, a steam reforming unit which has, in particular, a first steam reforming stage and a second steam reforming stage, and also a water gas shift unit for carrying out the water gas shift reaction, with the water gas shift unit comprising, in particular, a first water gas shift reactor and a second water gas shift reactor. The water gas shift unit is, in particular, an adiabatically operated fixed-bed reactor. When carrying out a two-stage water gas shift reaction, it is possible to use two fixed-bed reactors operated in series.

A plant in which the reaction apparatus is configured as a trickle-bed reactor allows improved hydrogenation of the hydrogen carrier medium by the intermediate gas mixture. As an alternative, a bubble column reactor or a sparged and stirred suspension reactor is conceivable.

A plant having a first storage unit for storing the hydrogenated hydrogen carrier medium makes it possible to store the hydrogen in chemically bound form in the place where it is produced. Handling of the hydrogen which has been produced and stored is simplified.

A plant having a dehydrogenation unit for dehydrogenating the hydrogenated hydrogen carrier medium allows direct liberation of the hydrogen which has been produced and stored in very pure form. Pure hydrogen produced from natural gas can, for example, be converted directly into electricity by means of a fuel cell.

A plant can additionally have a first hydrogen carrier medium interface in order to transport hydrogenated, i.e. loaded, hydrogen carrier medium away from the plant. The loaded hydrogen carrier medium can be handled particularly comfortably and can, for example, be transported via existing piping systems and/or tankers. Unloading of the hydrogenated hydrogen carrier medium, in particular during a low-energy period of time, and/or in particular at a physically distant place is made possible thereby. The plant can additionally have a second hydrogen carrier medium interface for introduction of dehydrogenated, i.e. unloaded, hydrogen carrier medium. It is possible to introduce hydrogen carrier medium which is to be loaded with hydrogen. In particular, it is not necessary to provide large storage capacities for the unloaded hydrogen carrier medium and at the same time to ensure reliable supply with hydrogen carrier medium. It is ensured that hydrogen which is obtained continuously when using the process of the invention, in particular at a natural gas source, can be utilized reliably since a stock of unloaded hydrogen carrier medium is always available.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:
FIG. 1 is a schematic view of a plant according to the invention for producing and storing hydrogen.

DESCRIPTION OF THE PREFERRED EMBODIMENTS

Referring to the drawings, FIG. 1 shows a plant 1 for producing and storing hydrogen from natural gas. Natural gas is a raw material gas mixture which comprises one or more hydrocarbon compounds and in particular methane. The plant 1 is connected to a natural gas source 2 via a natural gas conduit 3. The plant 1 has a pretreatment apparatus 4 for pretreatment of the raw material gas mixture to give an intermediate gas mixture. The pretreatment apparatus 4 is connected via an intermediate gas mixture conduit 5 to a reaction apparatus 6.

The pretreatment apparatus 4 comprises a desulfurization unit 7 for freeing the raw material gas mixture of sulfur compounds. The desulfurization unit 7 is, in particular, connected directly to the natural gas conduit 3. The desulfurization unit 7 is connected via a conduit 8 to a steam reforming unit 9. The steam reforming unit 9 comprises a first steam reforming stage 10 and a second steam reforming stage 11 located downstream of the first steam reforming stage 10. The steam reforming unit 9 is connected to a water gas shift reaction unit 13 via a further conduit 12. The water gas shift reaction unit 13 comprises a first water gas shift reactor 14 and a second water gas shift reactor 15 located downstream of the first water gas shift reactor 14. The water gas shift reaction unit 13 is connected to a carbon monoxide removal unit 16 and a water removal unit 17. A connecting conduit system 18 provided for this purpose allows optional inclusion of the carbon monoxide removal unit 16 and the water removal unit 17 in the pretreatment apparatus 4. This means that the pretreatment apparatus 4 can be operated with the carbon monoxide removal unit 16 and/or with the water removal unit 17 or none of the two units. The connecting conduit system 18 is connected directly to the intermediate gas mixture conduit 5.

The reaction apparatus 6 is, in particular, configured as a trickle-bed reactor. The reaction apparatus 6 serves as hydrogenation unit for hydrogenating a hydrogen carrier medium by means of the hydrogen of the intermediate gas mixture. The reaction apparatus 6 contains a solid hydrogenation catalyst. LOHC serves as hydrogen carrier medium. The reaction apparatus 6 is connected via a hydrogen carrier medium conduit 19 to a first storage unit 20 for storing the hydrogenated hydrogen carrier medium. From the first storage unit 20, the hydrogenated hydrogen carrier medium can be fed to a dehydrogenation unit 21 for dehydrogenating the hydrogenated hydrogen carrier medium. Hydrogen is liberated in the dehydrogenation unit 21. The hydrogen liberated can be fed to a hydrogen utilization unit 22. As an alternative to the dehydrogenation unit 21, a first hydrogen carrier medium interface 23 can be provided. The first hydrogen carrier medium interface 23 can, for example, provide for transport of the hydrogenated hydrogen carrier medium using tankers or via a suitable pipeline. Correspondingly, it is possible to provide a second hydrogen carrier medium interface 24 which allows unloaded hydrogen carrier medium to be fed into the plant 1, in particular in the form of tankers or a pipeline provided for this purpose. In addition, it is possible to provide a second storage unit 25 in which the unhydrogenated hydrogen storage medium is stored, in particular before it is fed to the reaction apparatus in order to be hydrogenated.

The reaction apparatus 6 as hydrogenation unit, the first storage unit 20, the dehydrogenation unit 21 and the second storage unit 25 can form a circulatory system, in particular a closed circulatory system.

A unit 26 for direct use of the carbon dioxide-rich gas from the hydrogenation unit or an isolation unit for carbon dioxide is connected to the reaction apparatus 6.

A process for producing and storing hydrogen will be explained in more detail below. From a natural gas source 2, for example a stranded gas source, natural gas is fed via the natural gas conduit 3 of the pretreatment apparatus 4 to the plant 1, in particular to the desulfurization unit 7. In the desulfurization unit 7, the natural gas is freed of sulfur compounds. The purified natural gas is subjected to two-stage steam reforming. For this purpose, the natural gas which has been freed of sulfur compounds is fed via the conduit 8 to a first steam reforming stage 10 of the steam reforming unit 9. Steam reforming occurs there at a first temperature. A gas mixture which can be produced in the first steam reforming stage 10 is fed to the second steam reforming stage 11. By addition of air and partial combustion of the gas mixture which has been partially formed in the first steam reforming stage 10, an increased process temperature of, for example, from 600° C. to 1000° C. can be achieved in the second steam reforming stage. Steam reforming is carried out in the presence of a nickel-containing catalyst. Steam reforming is carried out at a pressure of, in particular, from 20 bar to 40 bar. Later compression of the hydrogen is thus dispensable.

The steam-reformed gas mixture is fed to the water gas shift reaction unit 13 via the conduit 12. In the first water gas shift reactor 14, carbon monoxide in the gas mixture is reacted with water to form carbon dioxide and hydrogen. The process temperature in the first water gas shift reactor 14 is from 300° C. to 500° C. A solid iron/chromium catalyst is used for this purpose. In the second water gas shift reactor 15, a particularly effective, virtually complete, conversion of carbon monoxide is carried out at reduced temperatures, in particular in the range from 180° C. to 300° C., by means of a solid copper/zinc oxide catalyst. The water gas shift reactors 14, 15 are, in particular, configured as adiabatically operable fixed-bed reactors.

After the water gas shift reaction, the gas mixture can, within the framework of the pretreatment, be subjected to a selective removal of carbon monoxide in the carbon monoxide removal unit 16 and/or a selective removal of water in the water removal unit 17.

Overall, an intermediate gas mixture which has an increased proportion of hydrogen compared to the natural gas as raw material gas mixture is provided by the pretreatment in the pretreatment apparatus 4. A proportion of carbon monoxide formed during steam reforming is made so low by the process steps of the pretreatment apparatus 4 that it is unproblematical for a subsequent hydrogenation.

The intermediate gas mixture is fed to the reaction apparatus 6 and contacted there with the LOHC. The hydrogen is chemically bound directly to the hydrogen carrier medium, i.e. to the LOHC. The hydrogenated LOHC is conveyed via the conduit 19 to the first storage unit 20 and from there fed via the first hydrogen carrier medium interface 23 into a pipeline grid provided for this purpose or into a tanker provided for this purpose and transferred to a remote location for utilization after liberation of hydrogen.

The plant 1 can be supplied with unhydrogenated LOHC via a second storage unit 25. The second storage unit 25 can, for example, be supplied from the outside via a second hydrogen carrier medium interface 24. It is also possible for the dehydrogenation unit 21 to be connected directly to the second storage unit 25.

After the liberation of hydrogen in the dehydrogenation unit 21, dehydrogenated LOHC can be conveyed to further use in the circulatory system of the second storage unit 25.

As a result of the hydrogenation of the LOHC in the reaction apparatus 6, carbon dioxide is obtained in enriched form. The carbon dioxide has been largely freed of hydrogen. The carbon dioxide-rich gas obtained in the hydrogenation in the reaction apparatus 6 is industrially usable. The isolation unit 26 for the carbon dioxide can be connected to further components for handling and/or direct utilization of the carbon dioxide.

While specific embodiments of the invention have been shown and described in detail to illustrate the application of the principles of the invention, it will be understood that the invention may be embodied otherwise without departing from such principles.

The invention claimed is:

1. A process for producing and storing hydrogen, the process comprising the process steps of:
   providing a raw material gas mixture comprising at least one hydrocarbon compound;
   pretreating the raw material gas mixture to produce an intermediate gas mixture having a proportion of hydrogen, said proportion of hydrogen being increased compared to the proportion of hydrogen in the raw material gas mixture, wherein pretreating the raw material gas mixture comprises a selective removal of water after a water gas shift reaction, the intermediate gas mixture comprising as other constituents at least one of carbon dioxide, carbon monoxide and methane;
   contacting the intermediate gas mixture with a hydrogen carrier medium in order to hydrogenate the hydrogen carrier medium, wherein the contacting of the intermediate gas mixture with the hydrogen carrier medium brings a selective depletion of the hydrogen in the intermediate gas mixture, since said other constituents do not react with the hydrogen carrier medium.

2. A process as claimed in claim 1, wherein a proportion of carbon monoxide in the intermediate gas mixture is less than 0.5% by volume.

3. A process as claimed in claim 1, wherein pretreating the raw material gas mixture further comprises desulfurization in order to remove sulfur compounds from the raw material gas mixture.

4. A process as claimed in claim 3, wherein the desulfurization of the raw material gas mixture occurs prior to the selective removal of water and the water gas shift reaction.

\* \* \* \* \*